UNITED STATES PATENT OFFICE.

GREEN ROBERT BISHOP KEMPTON, OF WESTHAM, COUNTY OF ESSEX, ENGLAND.

LAUNDRY-BLUE.

SPECIFICATION forming part of Letters Patent No. 426,504, dated April 29, 1890.

Application filed May 15, 1889. Serial No. 310,912. (Specimens.) Patented in England March 29, 1889, No. 5,380.

*To all whom it may concern:*

Be it known that I, GREEN ROBERT BISHOP KEMPTON, a subject of Her Majesty the Queen of Great Britain, residing at Westham, in the county of Essex, England, have invented a new and useful composition of matter to be used as a laundry-blue for coloring clothes, fabrics, and the like during the process of washing, (for which I have obtained a patent in Great Britain, No. 5,380, dated March 29, 1889,) of which the following is a specification.

My composition consists of a strong solution of an aniline or other mineral or vegetable blue color that is not corrosive in pure water, into which I dissolve and intimately mix alum and chloride of sodium, the latter ingredients being in the proportion relatively to each other of 3 to .01, by weight, respectively, and added to the solution above mentioned in sufficient quantity to produce a saturated solution of the combined salts. The resulting mixture is then to be evaporated and allowed to crystallize.

In using the above-named composition the linen, woolen, silk, or other fabric, after being washed in the ordinary way, is dipped into a weak solution of the crystals formed in the manner hereinbefore described, and thereby receives the required color. The crystalline, nature of the composition admits of perfect solubility without sediment, and the effect of the alum causes the fibers of the fabric to absorb the color readily. The composition may, however, be used in the ordinary way—that is to say, the crystals may be placed in a bag and stirred in the water until the required tint is obtained.

What I claim, and desire to secure by Letters Patent of the United States, is—

The herein-described composition of matter to be used as a laundry-blue, consisting of a saturated solution of alum, chloride of sodium, and color soluble in water, in the proportions specified, and crystallized in the manner set forth.

GREEN ROBERT BISHOP KEMPTON.

Witnesses:
FREDK. WALKER,
GEO. THOS. HYDE.